United States Patent Office 3,639,455
Patented Feb. 1, 1972

3,639,455
PRODUCTION OF HYDROXYETHYLENE-
CARBAMATE ETHERS
Harro Petersen and Klaus-Christian Renner, Frankenthal, Pfalz, and Hans Diem, Mannheim, Germany, assignors to Badische Anilin- & Soda-Fabrik Aktiengesellschaft, Ludwigshafen (Rhine), Germany
No Drawing. Filed July 31, 1968, Ser. No. 748,912
Claims priority, application Germany, Aug. 5, 1967, P 16 43 635.4
Int. Cl. C07c 125/04
U.S. Cl. 260—482 C                  8 Claims

ABSTRACT OF THE DISCLOSURE

Production of hydroxyethylenecarbamate ethers by the reaction of ethylene glycol monoethers with urea in the presence of nickel salts. The products are valuable starting materials for the production of textile finishes.

---

This invention relates to the production of hydroxyethylenecarbamate ethers by reaction of ethylene glycol monoethers with urea in the presence of nickel salts.

It is known from Houben-Weyl, "Methoden der organischen Chemie," volume 8, pages 190 et seq., that alcohols can be reacted with urea to form carbamates. The yields of the process are unsatisfactory even when long reaction periods and a large excess of alcohol are used, because byproducts, for example biuret and esters of allophanic acid and cyanuric acid are formed. The yields can be improved by using zinc acetate, lead acetate or cobalt chloride (Zeitung für Naturforschung, 1, 520 (1946)) or metal salts and metals, examples given being zinc dust, zinc oxide, vanadium pentoxide, tin(IV) chloride, tin(II) chloride, zinc salts, manganese acetate, chromium acetate, lead acetate, uranyl acetate, silver nitrate and copper sulfate. The carbamates obtained in this way however still contain a certain proportion of the said byproducts and this precludes their use for all syntheses which require starting materials of maximum purity. Such crude carbamates cannot be used immediately for the production of dimethylol compounds which are to be used as finishing agents for the chlorine-fast finishing of textiles, but they have first to be purified by repeated distillation or recrystallization.

By adopting the procedure of the said patent specification (which does not mention nickel salts) and using the said metal catalysts and glycol monoethers instead of monohydric alkanols as starting materials, not only is the purity of the end product unsatisfactory, but also the yield of end product in many cases. The following table gives the results of the reaction of urea with methyl glycol (molar ratio 1:3) to form methoxyethylenecarbamate. The column headed Amount gives the amount of catalyst in percent by weight with reference to urea and the column headed Yield gives the yield with reference to urea. The reaction temperature is 130° C. and the reaction period is twenty-five hours.

TABLE

| Catalyst | Amount | Yield, percent |
|---|---|---|
| Boron trifluoride | 1 | 50 |
| Aluminum acetate | 5 | 55 |
| Manganese sulfate | 5 | 57 |
| Sodium aluminate | 5 | 58 |
| Sodium boron tetrafluoride | 1 | 63 |
| Copper turnings | 5 | 70 |
| Tin (IV) chloride | 5 | 85 |

It is an object of this invention to provide a new process for the production of hydroxyethylenecarbamate ethers in a simple way and in good yields and purity.

This and other objects of the invention are achieved and hydroxyethylenecarbamate ethers having the general Formula I:

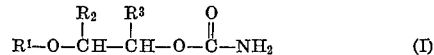

in which $R^1$, $R^2$ and $R^3$ denote identical or different aliphatic, cycloaliphatic, araliphatic or aromatic radicals and $R^2$ and $R^3$ may also denote a hydrogen atom are advantageously obtained by reacting an ethylene glycol monoether having the general Formula II:

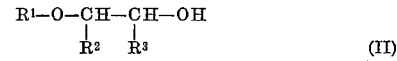

in which $R^1$, $R^2$ and $R^3$ have the above meanings with urea at a temperature of from 100° to 150° C. in the presence of a nickel compound, preferably nickel chloride.

The process according to this invention is derived from the discovery that nickel salts, preferably nickel chloride, are selective catalysts for the formation of carbamates in the said reaction, whereas other metal catalysts at the same time catalyze the formation of biuret, cyanuric acid and esters of allophanic acid. Having regard to the publications mentioned above it is surprising that the process according to this invention gives a large number of hydroxyethylenecarbamate ethers in a simple way in better yields and purity without the formation of substantial amounts of the abovementioned byproducts. The carbamates thus obtained satisfy exacting requirements of purity. They may be reacted for example with formaldehyde without previous purification to form the abovementioned dimethylol compounds used for chlorine-fast textile finishing and thus provide a labor saving and more economical method for the production of auxiliaries, for example for textile finishing. Ethylene glycol monoethers having the general Formula II are used as starting materials in addition to urea. Preferred starting materials (II) and accordingly preferred end products (I) are those in whose formulae $R^1$, $R^2$ and $R^3$ denote identical or different alkyl, cycloalkyl, aralkyl or aryl groups each having up to eighteen and particularly up to seven carbon atoms or the radicals $R^2$ and $R^3$ may denote hydrogen atoms, the said alkyl groups being linear or branched. For example the following compounds (II) may be used: methyl, ethyl, butyl, phenyl, benzyl and cyclohexyl glycol monoethers; and the corresponding propylene, butylene, 2-phenyl, 2-cyclohexyl, 2-benzyl and 1,2-dimethyl ethylene 1,2-glycol monoethers. As a rule the starting materials are used in a molar ratio of urea to ethylene glycol monoether of 1:1.5 to 1:5, but a higher excess of ether may also be supplied to the reaction. Nickel compounds, for example nickel sulfate, acetate, bromide, iodide, oxide, nitrate, formate or preferably nickel chloride, are used as catalysts. The nickel compounds may also be in the form of the corresponding hydrates, for example nickel chloride hexahydrate. It is advantageous to use the nickel compounds in an amount of 0.1 to 5%, preferably 0.5 to 2%, by weight with reference to the weight of urea.

The reaction is carried out at a temperature of from 100° to 150° C., preferably from 125° to 140° C., at atmospheric or superatmospheric pressure, continuously or batchwise. The starting material (II) generally serves at the same time as the medium for the reaction, and if desired organic solvents which are inert under the reaction conditions such as aromatic hydrocarbons, for example benzene, xylene or toluene, may also be used.

Since the reaction of urea with the compounds having the general Formula II is an equilibrium reaction, it is advantageous to remove from the reaction solution the ammonia formed in the reaction by passing in nitrogen.

The reaction may be carried out as follows: A mixture of urea, starting material (II), nickel compound and any solvent is brought to the above mentioned temperature within three hours while stirring well and kept at this temperature for about fifteen to twenty hours. The reaction mixture is then cooled and filtered. The reaction product is separated from the filtrate by a conventional method. Unreacted starting material (II) can be returned to the reaction.

The compounds which can be prepared by the process according to this invention are valuable starting materials for the production of textile finishing agents. Thus for example in the form of their N-dimethylol compounds they may be used in an amount of 100 to 200 grams per kilogram of fibrous material in aqueous suspension and in the presence of 20 to 30 grams of $MgCl_2$ for impregnating cotton cloth, which is then dried and condensed at 140° to 200° C. in a condensation unit, a chlorine-fast crease resist finish being achieved.

The invention is illustrated by the following examples. The parts given are parts by weight.

EXAMPLE 1

A mixture of 300 parts of urea, 1140 parts of methyl glycol and 6 parts of nickel chloride is heated from room temperature to 130° C. in a stirred vessel within a period of three hours. The reaction mixture is then stirred at 130° C. for another eighteen hours. The major portion of the ammonia formed in the reaction is eliminated during the first five hours. The reaction mixture is then filtered and the excess methyl glycol is removed by distillation at subatmospheric pressure. 555 parts of methoxyethylenecarbamate is obtained, i.e., 93.3% of the theory with reference to the amount of urea used. Distillation of the carbamate obtained shows that the product distills in the range of from 103° to 108° C. at a pressure of 0.5 mm. and leaves a residue of only 0.6% by weight.

*Analysis.*—Calcd. for $C_4H_9O_3N$ (119) (percent): C, 40.3; H, 7.56; O, 40.3; N, 11.75. Found (percent): C, 40.2; H, 7.6; O, 40.0; N, 11.7.

EXAMPLE 2

120 parts of urea is mixed in a stirred vessel with 236 parts of butyl glycol and then with 2 parts of nickel chloride. The mixture is heated up to 135° C. within a period of three hours while stirring. The reaction mixture is then kept for another twenty hours at 135° C., after which it is allowed to cool. The mixture is filtered and the excess of butyl glycol is evaporated from the filtrate at subatmospheric pressure. 302 parts of n-butoxyethylenecarbamate is obtained (i.e. 94% of the theory with reference to the amount of urea used). When the end product is distilled in a high vacuum, it leaves a residue of only 0.9% by weight.

We claim:
1. A process for the production of hydroxyethylenecarbamate ethers having the general Formula I:

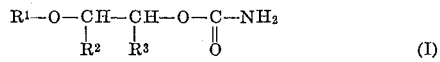

in which $R^1$, $R^2$ and $R^3$ denote identical or different alkyl, cycloalkyl, aralkyl or aryl groups each having up to eighteen carbon atoms and $R^2$ and $R^3$ may also denote hydrogen atoms which comprises reacting an ethylene glycol monoether having the general Formula II:

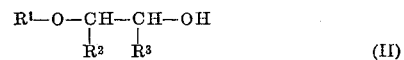

in which $R^1$, $R^2$ and $R^3$ have the above meanings with urea at a temperature of from 100° to 150° C. in the presence of a nickel compound selected from the group consisting of nickel sulfate, nickel acetate, nickel bromide, nickel iodide, nickel oxide, nickel nitrate, nickel formate and nickel chloride.

2. A process as claimed in claim 1 carried out in the presence of nickel chloride.

3. A process as claimed in claim 1 carried out while passing nitrogen through.

4. A process as claimed in claim 1 carried out with a molar ratio of urea to ethylene glycol monoether of from 1:1.5 to 1:5.

5. A process as claimed in claim 1 carried out in the presence of a nickel compound in an amount of 0.1 to 5% by weight with reference to the weight of urea.

6. A process as claimed in claim 1 carried out in the presence of a nickel compound in an amount of 0.5 to 2% by weight with reference to the weight of urea.

7. A process as claimed in claim 1 carried out at a temperature of from 125° to 140° C.

8. A process as claimed in claim 1 carried out in the presence of an inert organic solvent.

References Cited

FOREIGN PATENTS 740,468  8/1966  Canada _____ 260—482 C
531,030  12/1940  Great Britain _____ 260—482 C LEWIS GOTTS, Primary Examiner P. J. KILLOS, Assistant Examiner U.S. Cl. X.R.

8—116.2 R, 134 R